US008352709B1

(12) United States Patent
Glasco et al.

(10) Patent No.: US 8,352,709 B1
(45) Date of Patent: Jan. 8, 2013

(54) DIRECT MEMORY ACCESS TECHNIQUES THAT INCLUDE CACHING SEGMENTATION DATA

(75) Inventors: David B. Glasco, Austin, TX (US); John S. Montrym, Los Altos Hills, CA (US); Lingfeng Yuan, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 403 days.

(21) Appl. No.: 11/523,830

(22) Filed: Sep. 19, 2006

(51) Int. Cl.
*G06F 12/06* (2006.01)

(52) U.S. Cl. .......................... 711/220; 711/3; 711/203

(58) Field of Classification Search .................. None
See application file for complete search history.

(56) References Cited

U.S. PATENT DOCUMENTS

| 3,815,101 | A | 6/1974 | Boss et al. |
|---|---|---|---|
| 3,950,729 | A | 4/1976 | Fletcher et al. |
| 4,654,790 | A | 3/1987 | Woffinden |
| 4,797,814 | A | 1/1989 | Brenza |
| 4,812,981 | A | 3/1989 | Chan et al. |
| 5,123,094 | A | 6/1992 | MacDougall |
| 5,179,669 | A | 1/1993 | Peters |
| 5,245,702 | A | 9/1993 | McIntyre et al. |
| 5,278,962 | A | 1/1994 | Masuda et al. |
| 5,414,824 | A | 5/1995 | Grochowski |
| 5,446,854 | A | 8/1995 | Khalidi et al. |
| 5,526,504 | A | 6/1996 | Hsu et al. |
| 5,649,102 | A | 7/1997 | Yamauchi et al. |
| 5,649,184 | A | 7/1997 | Hayashi et al. |
| 5,696,925 | A * | 12/1997 | Koh ............................. 711/203 |
| 5,949,785 | A | 9/1999 | Beasley |
| 5,963,984 | A | 10/1999 | Garibay, Jr. et al. |
| 5,999,189 | A | 12/1999 | Kajiya et al. |
| 6,012,132 | A | 1/2000 | Yamada et al. |
| 6,298,390 | B1 | 10/2001 | Matena et al. |

(Continued)

FOREIGN PATENT DOCUMENTS

JP   02288927   11/1990

(Continued)

OTHER PUBLICATIONS

Harper et al., (Rapid recovery from transient Faults in the fault tolerant processor with fault-tolerant shared memory) 1990, IEEE, p. 350-359.

(Continued)

*Primary Examiner* — Jack A Lane

(57) ABSTRACT

A memory access technique, in accordance with one embodiment of the present invention, includes caching segmentation data. The technique utilizes a separate memory for storing a plurality of context specifiers and an MMU. The MMU includes an on-chip cache and a segmentation unit. The MMU receives a location of a particular context specifier and a corresponding context index for each of one or more of the plurality of context specifiers stored in the separate memory. The segmentation unit retrieves the particular context specifier and caches it locally. The segmentation unit also binds the cache location of the particular context specifier to the corresponding context index. After caching one or more context specifiers and generating a corresponding binding, the segmentation unit may receive a memory access request that includes a given context index. A given context specifier that is cached locally is accessed by the segmentation unit using the context index to get a base address. The base address from the given context specifier is utilized by the segmentation unit to generate a virtual address for the memory access request.

19 Claims, 5 Drawing Sheets

U.S. PATENT DOCUMENTS

| | | | |
|---|---|---|---|
| 6,362,826 | B1 | 3/2002 | Doyle et al. |
| 6,457,115 | B1 | 9/2002 | McGrath |
| 6,470,428 | B1 | 10/2002 | Milway et al. |
| 6,499,090 | B1 | 12/2002 | Hill et al. |
| 6,549,997 | B2 | 4/2003 | Kalyanasundharam |
| 6,636,223 | B1 | 10/2003 | Morein |
| 6,658,538 | B2 * | 12/2003 | Arimilli et al. ............... 711/141 |
| 6,742,104 | B2 | 5/2004 | Chauvel et al. |
| 6,813,699 | B1 * | 11/2004 | Belgard ........................ 711/213 |
| 6,823,433 | B1 * | 11/2004 | Barnes et al. ................. 711/163 |
| 6,839,813 | B2 | 1/2005 | Chauvel |
| 6,859,208 | B1 | 2/2005 | White |
| 6,877,077 | B2 | 4/2005 | McGee et al. |
| 6,883,079 | B1 | 4/2005 | Priborsky |
| 7,007,075 | B1 | 2/2006 | Coffey |
| 7,082,508 | B2 | 7/2006 | Khan et al. |
| 7,107,441 | B2 | 9/2006 | Zimmer et al. |
| 7,120,715 | B2 | 10/2006 | Chauvel et al. |
| 7,159,095 | B2 | 1/2007 | Dale et al. |
| 7,194,597 | B2 | 3/2007 | Willis et al. |
| 7,234,038 | B1 | 6/2007 | Durrant |
| 7,275,246 | B1 | 9/2007 | Yates, Jr. et al. |
| 7,401,358 | B1 | 7/2008 | Christie et al. |
| 7,447,869 | B2 | 11/2008 | Kruger et al. |
| 7,519,781 | B1 | 4/2009 | Wilt |
| 7,545,382 | B1 | 6/2009 | Montrym et al. |
| 2002/0004823 | A1 | 1/2002 | Anderson et al. |
| 2002/0013889 | A1 | 1/2002 | Schuster et al. |
| 2002/0169938 | A1 | 11/2002 | Scott et al. |
| 2002/0172199 | A1 | 11/2002 | Scott et al. |
| 2003/0014609 | A1 | 1/2003 | Kissell |
| 2003/0167420 | A1 | 9/2003 | Parsons |
| 2003/0196066 | A1 | 10/2003 | Mathews |
| 2003/0236771 | A1 | 12/2003 | Becker |
| 2004/0025161 | A1 | 2/2004 | Chauvel et al. |
| 2004/0054833 | A1 | 3/2004 | Seal et al. |
| 2004/0078778 | A1 | 4/2004 | Leymann et al. |
| 2004/0153350 | A1 | 8/2004 | Kim et al. |
| 2004/0193831 | A1 | 9/2004 | Moyer |
| 2004/0215918 | A1 | 10/2004 | Jacobs et al. |
| 2004/0268071 | A1 | 12/2004 | Khan et al. |
| 2005/0050013 | A1 | 3/2005 | Ferlitsch |
| 2005/0097280 | A1 | 5/2005 | Hofstee et al. |
| 2005/0268067 | A1 | 12/2005 | Lee et al. |
| 2006/0004984 | A1 | 1/2006 | Morris et al. |
| 2006/0069879 | A1 | 3/2006 | Inoue et al. |
| 2006/0069899 | A1 | 3/2006 | Schoinas et al. |
| 2006/0187945 | A1 | 8/2006 | Andersen |
| 2006/0195683 | A1 | 8/2006 | Kissell |
| 2006/0230223 | A1 | 10/2006 | Kruger et al. |
| 2006/0259732 | A1 | 11/2006 | Traut et al. |
| 2006/0259825 | A1 | 11/2006 | Cruickshank et al. |
| 2006/0282645 | A1 | 12/2006 | Tsien |
| 2006/0288174 | A1 | 12/2006 | Nace et al. |
| 2007/0067505 | A1 | 3/2007 | Kaniyur et al. |
| 2007/0073996 | A1 | 3/2007 | Kruger et al. |
| 2007/0106874 | A1 | 5/2007 | Pan et al. |
| 2007/0126756 | A1 | 6/2007 | Glasco et al. |
| 2007/0157001 | A1 | 7/2007 | Ritzau |
| 2007/0168634 | A1 | 7/2007 | Morishita et al. |
| 2007/0168643 | A1 | 7/2007 | Hummel et al. |
| 2008/0263284 | A1 | 10/2008 | da Silva et al. |

FOREIGN PATENT DOCUMENTS

| | | |
|---|---|---|
| JP | 03054660 | 3/1991 |
| JP | 04182858 | 6/1992 |

OTHER PUBLICATIONS

Ooi, (Fault Tolerant Architecture in a cache memory control LSI), 1992, IEEE, 507-514.
Oracle, (Oracle 8i Parallel server), 1999, Oracle, Release 2 (8.1.6) 1-216.
Shalan. (Dynamic Memory Management for embedded real-time multiprocessor system on a chip), 2000, ACM. 180-186.
Shalan. (Dynamic Memory Management for embedded real-time multiprocessor system on a chip), 2003, Georgia Inst. Of Tech. 1-118.
Wikipedia, (Page Fault definition) Wikipedia, 1-4.
Osronline, (The Basics: So what is a page fault?) May 2003, p. 1-2.
Non-Final OA Dated Aug. 19, 2009; U.S. Appl. No. 11/592,076.
Non Final Office Action; Mail Date Apr. 27, 2009; U.S. Appl. No.: 11/591,685.
PCMAG (Definition of: page fault) PCMag, 1 page; Mar. 2009.
Non-Final OA Dated Jan. 20, 2010; U.S. Appl. No. 11/586,756.
Final OA Dated Jun. 4, 2009; U.S. Appl. No. 11/586,756.
Non-Final OA Dated Nov. 18, 2008; U.S. Appl. No. 11/586,756.
Non-Final OA Dated Aug. 19, 2009; U.S. Appl. No. 11/591,857.
Final OA Dated Nov. 23, 2009; U.S. Appl. No. 11/592,106.
Non-Final OA Dated Apr. 1, 2009; U.S. Appl. No. 11/592,106.
Non-Final OA Dated Oct. 29, 2008; U.S. Appl. No. 11/523,950.
Notice of Allowance Dated Apr. 24, 2009; U.S. Appl. No. 11/523,950.
Notice of Allowance Dated Sep. 3, 2009; U.S. Appl.No. 11/523,950.
Notice of Allowance Dated Dec. 24, 2009; U.S. Appl. No. 11/523,950.
Non-Final OA Dated Dec. 16, 2008; U.S. Appl. No. 11/586,826.
Non-Final OA Dated Feb. 17, 2009; U.S. Appl. No. 11/592,819.
Final OA Dated Nov. 9, 2009; U.S. Appl. No. 11/591,629.
Non-Final OA Dated Feb. 20, 2009; U.S. Appl. No. 11/591,629.
Final OA Dated Nov. 24, 2009; U.S. Appl. No. 11/592,780.
Non-Final OA Dated Apr. 2, 2009; U.S. Appl. No. 11/592,780.
Non-Final OA Dated Sep. 24, 2009; U.S. Appl. No. 11/588,177.
Final OA Dated May 21, 2009; U.S. Appl. No. 11/588,177.
Non-Final OA Dated Nov. 13, 2008; U.S. Appl. No. 11/588,177.
Final OA Dated Dec. 8, 2009; U.S. Appl. No. 11/591,856.
Non-Final OA Dated May 11, 2009; U.S. Appl. No. 11/591,856.
Final OA Dated Oct. 14, 2009; U.S. Appl.No. 11/586,825.
Non-Final OA Dated Mar. 18, 2009; U.S. Appl. No. 11/586,825.
Final Office Action; Mail Date Nov. 20, 2009; U.S. Appl. No. 11/591,685.
Restriction Requirement; Mail Date Apr. 27, 2009; U.S. Appl. No. 11/591,857.
Notice of Allowance; Mail Date Jun. 22, 2009; U.S. Appl. No. 11/586,826.
Notice of Allowance; Mail Date Dec. 14, 2009; U.S. Appl. No. 11/586,826.
Non Final Office Action; Mail Date Mar. 17, 2010; U.S. Appl. No. 11/592,819.
Notice of Allowance; Mail Date Jan. 19, 2010; U.S. Appl. No. 11/592,819.
Non Final Office Action; Mail Date Feb. 22, 2010; U.S. Appl. No. 11/586,825.
Chaudhuri, "The impact of NACKs in shared memory scientific applications", Feb. 2004, IEEE, IEEE Transactions on Parallel and distributed systems vol. 15, No. 2, pp. 134-150.
Laibinis, "Formal Development of Reactive Fault Tolerant Systems", Sep. 9, 2005, Springer, Second International Workshop, RISE 2005, p. 234-249.
Wikipedia, Memory Address, Oct. 29, 2010, pp. 1-4, www.wikipedia.com.
Wikipedia, Physical Address, Apr. 17, 2010, pp. 1-2, www.wikipedia.com.
Non Final Office Action, Mail Date May 11, 2010, U.S. Appl. No. 11/591,685.
Final Office Action, Mail Date Oct. 27, 2010, U.S. Appl. No. 11/591,685.
Restriction Dated Aug. 10, 2010; U.S. Appl. No. 12/650,068.
Restriction Requirement; Mail Date Apr. 28, 2009; U.S. Appl. No. 11/592,076.
Notice of Allowance; Mail Date Jan. 29, 2010; U.S. Appl. No. 11/592,076.
Notice of Allowance; Mail Date May 4, 2010; U.S. Appl. No. 11/592,076.
Notice of Allowance; Mail Date Aug. 13, 2010; U.S. Appl. No. 11/592,076.
Final Office Action Dated Aug. 1, 2010; U.S. Appl. No. 11/586,756.
Notice of Allowance Dated Dec. 27, 2010; U.S. Appl. No. 11/586,756.
Restriction Dated Apr. 27, 2009; U.S. Appl. No. 11/591,857.
Office Action Dated Dec. 7, 2010; U.S. Appl. No. 11/591,857.

Final Office Action Dated Jun. 25, 2010; U.S. Appl. No. 11/592,106.
Office Action Dated Dec. 16, 2010; U.S. Appl. No. 11/592,106.
Office Action Dated Sep. 19, 2008; U.S. Appl. No. 11/523,926.
Final Office Action Dated Apr. 10, 2009; U.S. Appl. No. 11/523,926.
Office Action Dated Oct. 1, 2009; U.S. Appl. No. 11/523,926.
Notice of Allowance Dated Mar. 29, 2010; U.S. Appl. No. 11/523,926.
Notice of Allowance Dated Jul. 9, 2010; U.S. Appl. No. 11/523,926.
Notice of Allowance Dated Oct. 27, 2010; U.S. Appl. No. 11/523,926.
Notice of Allowance Dated Jul. 21, 2010; U.S. Appl. No. 11/523,950.
Notice of Allowance Dated Nov. 3, 2010; U.S. Appl. No. 11/523,950.
Notice of Allowance Dated Jun. 22, 2009; U.S. Appl. No. 11/586,950.
Notice of Allowance Dated Dec. 14, 2009; U.S. Appl. No. 11/586,950.
Notice of Allowance Dated Oct. 16, 2009; U.S. Appl. No. 11/592,819.
Office Action Dated Mar. 17, 2010; U.S. Appl. No. 11/592,819.
Notice of Allowance Dated Nov. 23, 2010; U.S. Appl. No. 11/592,819.
Office Action Dated May 27, 2010; U.S. Appl. No. 11/591,629.
Office Action Dated Nov. 3, 2010; U.S. Appl. No. 11/591,629.
Office Action Dated Apr. 28, 2010; U.S. Appl. No. 11/592,780.
Office Action Dated Oct. 13, 2010; U.S. Appl. No. 11/592,780.
Final Office Action Dated Apr. 27, 2010; U.S. Appl. No. 11/255,177.
Office Action Dated Apr. 27, 2010; U.S. Appl. No. 11/591,856.
Notice of Allowance Dated Nov. 12, 2010; U.S. Appl. No. 11/591,856.
Office Action Dated Feb. 22, 2010; U.S. Appl. No. 11/586,825.
Notice of Allowance Dated Aug. 16, 2010; U.S. Appl. No. 11/586,825.
Notice of Allowance Dated Nov. 26, 2010; U.S. Appl. No. 11/586,825.
Notice of Allowance; Mail Date Nov. 26, 2010; U.S. Appl. No. 11/592,076.
Notice of Allowance Mailed May 12, 2011; U.S. Appl. No. 11/586,756.
Notice of Allowance Mailed Mar. 18, 2011; U.S. Appl. No. 11/591,587.
Final Office Action Mailed Jun. 8, 2011; U.S. Appl. No. 11/591,629.
Notice of Allowance Mailed Mar. 9, 2011; U.S. Appl. No. 11/591,856.
Notice of Allowance Mailed Mar. 4, 2011; U.S. Appl. No. 11/586,825.
Non-Final Office Action, Mailed May 9, 2011; U.S. Appl. No. 11/591,685.
Notice of Allowance, Mailed Mar. 17, 2011; U.S. Appl. No. 11/592,076.
Notice of Allowance, Mailed Jun. 29, 2011; U.S. Appl. No. 11/592,076.
Non-Final Office Action, Mailed Feb. 1, 2011; U.S. Appl. No. 12/650,068.
Final Office Action, Mailed Aug. 9, 2011; U.S. Appl. No. 12/650,068.
Notice of Allowance, Mailed Aug. 25, 2011; U.S. Appl. No. 11/586,756.
Final Office Action, Mailed 5-4-210; U.S. Appl. No. 11/591,857.
Notice of Allowance, Mailed Jul. 21, 2011; U.S. Appl. No. 11/591,857.
Final Office Action, Mailed Jul. 5, 2011; U.S. Appl. No. 11/592,106.
Notice of Allowance, Mailed Feb. 3, 2011; U.S. Appl. No. 11/523,926.
Notice of Allowance, Mailed May 23, 2011; U.S. Appl. No. 11/523,926.
Notice of Allowance, Mailed Aug. 23, 2011; U.S. Appl. No. 11/523,926.
Notice of Allowance, Mailed Jun. 9, 2011; U.S. Appl. No. 11/523,950.
Notice of Allowance, Mailed Aug. 30, 2011; U.S. Appl. No. 11/523,950.
Notice of Allowance, Mailed Feb. 16, 2011; U.S. Appl. No. 11/586,826.
Notice of Allowance, Mailed Jul. 26, 2011; U.S. Appl. No. 11/586,826.
Notice of Allowance, Mailed Apr. 19, 2011; U.S. Appl. No. 11/592,819.
Notice of Allowance, Mailed Sep. 7, 2011; U.S. Appl. No. 11/592,819.
Final Office Action, Mailed Apr. 12, 2011; U.S. Appl. No. 11/592,780.
Non-Final Office Action, Mailed Jun. 7, 2011; U.S. Appl. No. 11/588,177.
Notice of Allowance, Mailed Jun. 17, 2011; U.S. Appl. No. 11/591,856.
Notice of Allowance, Mailed Jun. 16, 2011; U.S. Appl. No. 11/586,825.
Final Office Action, Mailed Nov. 16, 2011; U.S. Appl. No. 11/591,685.
Notice of Allowance, Mailed Oct. 14, 2011; U.S. Appl. No. 11/592,076.
Non-Final Office Action, Mailed Nov. 16, 2011; U.S. Appl. No. 12/650,068.
Notice of Allowance, Mailed Jan. 13, 2012; U.S. Appl. No. 11/586,756.
Notice of Allowance, Mailed Oct. 28, 2011; U.S. Appl. No. 11/591,857.
Final Office Action, Mailed Dec. 2, 2011; U.S. Appl. No. 11/592,106.
Notice of Allowance, Mailed Oct. 28, 2011; U.S. Appl. No. 11/523,926.
Notice of Allowance, Mailed Nov. 14, 2011; U.S. Appl. No. 11/523,950.
Notice of Allowance, Mailed Dec. 9, 2011; U.S. Appl. No. 11/592,819.
Non-Final Office Action, Mailed Nov. 1, 2011; U.S. Appl. No. 11/592,780.
Final Office Action, Mailed Nov. 29, 2011; U.S. Appl. No. 11/588,177.
Notice of Allowance, Mailed Aug. 9, 2011; U.S. Appl. No. 11/586,825.
Notice of Allowance, Mailed Dec. 8, 2011; U.S. Appl. No. 11/586,825.
Guelfi et al., (Rapid Integration of Software Engineering Techniques) 2005, Second International Workshop, 9 pages.
Notice of Allowance, Mailed Feb. 22, 2012; U.S. Appl. No. 11/591,685.
Notice of Allowance, Mailed Jan. 27, 2012; U.S. Appl. No. 11/592,076.
Notice of Allowance, Mailed Feb. 10, 2012; U.S. Appl. No. 11/591,857.
Notice of Allowance, Mailed Feb. 24, 2012; U.S. Appl. No. 11/523,926.
Notice of Allowance, Mailed Dec. 27, 2011; U.S. Appl. No. 11/586,826.
Notice of Allowance, Mailed Sep. 26, 2011; U.S. Appl. No. 11/591,856.
Notice of Allowance, Mailed Jan. 5, 2012; U.S. Appl. No. 11/591,856.
Notice of Allowance, Mailed Mar. 21, 2012; U.S. Appl. No. 11/586,825.
Notice of Allowance Dated May 30, 2012; U.S. Appl. No. 11/591,685.
Notice of Allowance Dated May 1, 2012; U.S. Appl. No. 12/650,068.
Notice of Allowance Dated Jul. 6, 2012; U.S. Appl. No. 12/650,068.
Notice of Allowance Dated May 10, 2012; U.S. Appl. No. 11/592,076.
Notice of Allowance Dated May 15, 2012; U.S. Appl. No. 11/586,756.
Notice of Allowance Dated May 25, 2012; U.S. Appl. No. 11/591,857.
Final Office Action Dated May 10, 2012; U.S. Appl. No. 11/592,106.
Notice of Allowance Dated Jun. 1, 2012; U.S. Appl. No. 11/523,926.
Notice of Allowance Dated Jul. 5, 2012; U.S. Appl. No. 11/586,826.
Notice of Allowance Dated Jun. 7, 2012; U.S. Appl. No. 11/592,819.
Final Office Action Dated May 7, 2012; U.S. Appl. No. 11/592,780.

Notice of Allowance Dated Apr. 12, 2012; U.S. Appl. No. 11/591,856.
Notice of Allowance Dated Jun. 7, 2012; U.S. Appl. No. 11/591,856.
Notice of Allowance Dated Jul. 6, 2012; U.S. Appl. No. 11/586,825.
Notice of Allowance Dated Mar. 21, 2012; U.S. Appl. No. 11/586,825.
Notice of Allowance Dated Sep. 26, 2012; U.S. Appl. No. 11/591,685.
Notice of Allowance Dated Sep. 17, 2012; U.S. Appl. No. 12/650,068.
Notice of Allowance Dated Aug. 16, 2012; U.S. Appl. No. 11/523,830.
Notice of Allowance Dated Sep. 18, 2012; U.S. Appl. No. 11/591,857.
Notice of Allowance Dated Sep. 12, 2012; U.S. Appl. No. 11/523,926.
Notice of Allowance Dated Oct. 5, 2012; U.S. Appl. No. 11/592,819.
Office Action Dated Sep. 14, 2012; U.S. Appl. No. 11/591,629.
Notice of Allowance Dated Sep. 14, 2012; U.S. Appl. No. 11/588,177.
Notice of Allowance Dated Sep. 17, 2012; U.S. Appl. No. 11/591,856.
Notice of Allowance Dated Oct. 12, 2012; U.S. Appl. No. 11/586,825.

* cited by examiner

DIRECT MEMORY ACCESS TECHNIQUES THAT INCLUDE CACHING SEGMENTATION DATA

BACKGROUND OF THE INVENTION

Computing devices have made significant contributions toward the advancement of modern society and are utilized in a number of applications to achieve advantageous results. Numerous devices, such as personal computers, servers, hand-held devices, distributed computer systems, calculators, audio devices, video equipment, and telephone systems, have facilitated increased productivity and reduced costs in analyzing and communicating data in most areas of business, science, education and entertainment.

Computing device-readable memory is usually an important component of a number of computing devices. Computing device-readable memories typically store information utilized by a system in performance of a number of different tasks. Other components of a system typically request access to memory in order to retrieve (e.g., "read") information from and store (e.g., "write") information in the memory. Different types of memories (e.g., mass storage, main memory, removable memory and the like) and/or memory "spaces" (e.g., virtual, physical) can be utilized to support information storage.

Different types of computing device-readable memory can potentially offer different features, such as storage capacity and access speed. Traditionally, memories that have relatively large storage capacity have relatively slow access speeds. Memories that have relatively fast access speeds, in contrast, typically have relatively small storage capacities. For example, primary memories (e.g., main memory) are relatively fast compared to secondary memories (e.g., mass storage memory) but typically store less information. In view of the tradeoffs a number of systems transfer chunks of information between relatively fast small memories and relatively slow bulk memories to attempt to optimize speed and capacity.

Another technique for optimizing performance in computing devices is to utilize virtual and physical address spaces. Virtual address space allows applications to utilize as much memory as needed without regard to the memory utilization of other applications. The application retrieves and stores instructions and data utilizing virtual addresses, and the memory system retrieves and stores instruction and data in physical memory using physical addresses to optimize performance. Accordingly, translation between the virtual memory space addressing and physical memory space addressing is performed by the computing system. As a result, applications and data may be moved within memory and between different types of memory without having to recode applications.

Although the above techniques are currently utilized, the continued advancement of computing devices results in a continuous need for ever increasing memory system performance. Therefore, there is a continuing need for memory management techniques that provide additional optimization.

SUMMARY OF THE INVENTION

Embodiments of the present invention are directed toward memory access techniques that include caching segmentation data. In one embodiment, a method of accessing memory includes receiving a location of a context specifier and a context index. The context specifier is retrieved from a separate computing device-readable medium as specified by the location and cached locally. A binding between the context index and the cache address of context specifier is generated.

In another embodiment, a method of accessing memory includes receiving a memory access request that includes a given context index and a context offset. A given context specifier that is cached locally is accessed using the given context index. The base address from the given context specifier and the context offset from the memory access request are utilized to generate a virtual address for the memory access request.

In yet another embodiment, a memory access system includes a memory management unit (MMU) and a separate memory. The MMU includes an on chip cache and a segmentation unit. The separate memory is adapted to store a plurality of context specifiers. The segmentation unit is adapted to cache one or more of the plurality of context specifiers in the on chip cache and to bind a cache location of the cached context specifier to a corresponding context index.

Accordingly, embodiments of the present invention centralize management of the context specifier in the MMU. The MMU, for example, specifies and enforces the data format of the context specifiers, manages various types of faults and violations that may occur as a result of the attributes specified in the context specifiers and/or the like.

BRIEF DESCRIPTION OF THE DRAWINGS

Embodiments of the present invention are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Figure 1:
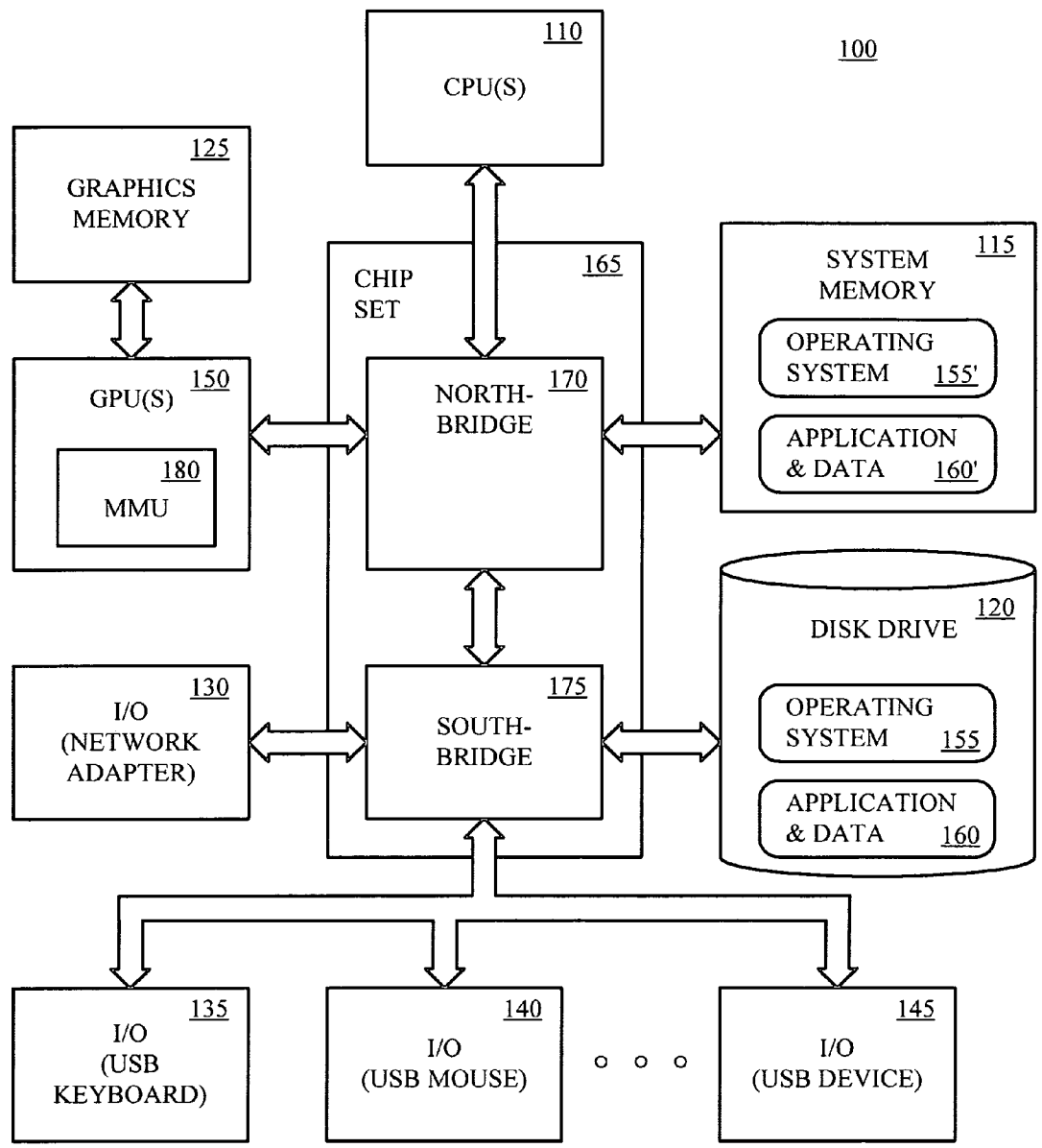
FIG. 1 shows a block diagram of an exemplary computing device for implementing embodiments of the present invention.

Referring to FIG. 1, an exemplary computing device 100 for implementing embodiments of the present invention is shown. The computing device 100 may be a personal computer, server computer, client computer, laptop computer, hand-held device, minicomputer, mainframe computer, distributed computer system or the like. The computing device 100 includes one or more processors (e.g., CPU) 110, one or more computing device-readable media 115, 120, 125 and one or more input/output (I/O) devices 120, 130, 135, 140, 145. The I/O device 130, 135, 140, 145 may include a network adapter (e.g., Ethernet card), CD drive, DVD drive and/or the like, and peripherals such as a keyboard, a pointing device, a speaker, a printer, and/or the like. The computing device 100 may also include one or more specialized processors, such as a graphics processing unit (GPU) 150.

The computing device-readable media 115, 120, 125 may be characterized as primary memory and secondary memory. Generally, the secondary memory, such as a magnetic and/or optical storage, provides for non-volatile storage of computer-readable instructions and data for use by the computing device 100. For instance, the disk drive 120 may store the operating system (OS) 155 and applications and data 160. The primary memory, such as the system memory 115 and/or graphics memory 125, provides for volatile storage of computer-readable instructions and data for use by the computing device 100. For instance, the system memory 115 may temporarily store a portion of the operating system 155' and a portion of one or more applications and associated data 160' that are currently used by the CPU 110, GPU 150 and the like.

The computing device-readable media 115, 120, 125, I/O devices 120, 130, 135, 140, 145, and GPU 150 may be communicatively coupled to the processor 110 by a chip set 165 and one or more busses. The chipset 165 acts as a simple input/output hub for communicating data and instructions between the processor 110 and the computing device-readable media 115, 120, 125, I/O devices 120, 130, 135, 140, 145, and GPU 150. In one implementation, the chipset 165 includes a northbridge 170 and southbridge 175. The northbridge 170 provides for communication with the processor and interaction with the system memory 115. The southbridge 175 provides for input/output functions.

The graphics processing unit 150 may include a memory management unit (MMU) 180 for managing the transfer of data and instructions. However, in other embodiments the MMU 180 may be an independent circuit, a part of the chip set 165, a part of the primary or secondary memory, or other component in the computing device 100.

The MMU 180 translates virtual addresses to physical addresses for each of a plurality of contexts. In one implementation, the virtual address space is divided into pages of size $2^N$ bytes. The pages may be from 2 kilobytes to 512 megabytes or more, and are typically 4 kilobytes to 64 kilobytes in size. In such cases, the MMU 180 generates virtual page numbers utilizing a base and limit value in a context specifier (e.g., DMA context) stored in a segment table. The context specifier is cached locally by the MMU 180 and is mapped to a context index utilized in memory access requests.

The MMU 180 also translates virtual page numbers to physical page numbers utilizing an address translation data structure. The address translation data structure may include a page table data structure. The page table data structure may include a page directory and a plurality of page tables stored in primary or secondary memory. The address translation data structure may also include a translation lookaside buffer cached in the MMU 180. After translation, the physical page number is combined with a byte offset of the virtual address to give the complete physical address.

Figure 2:
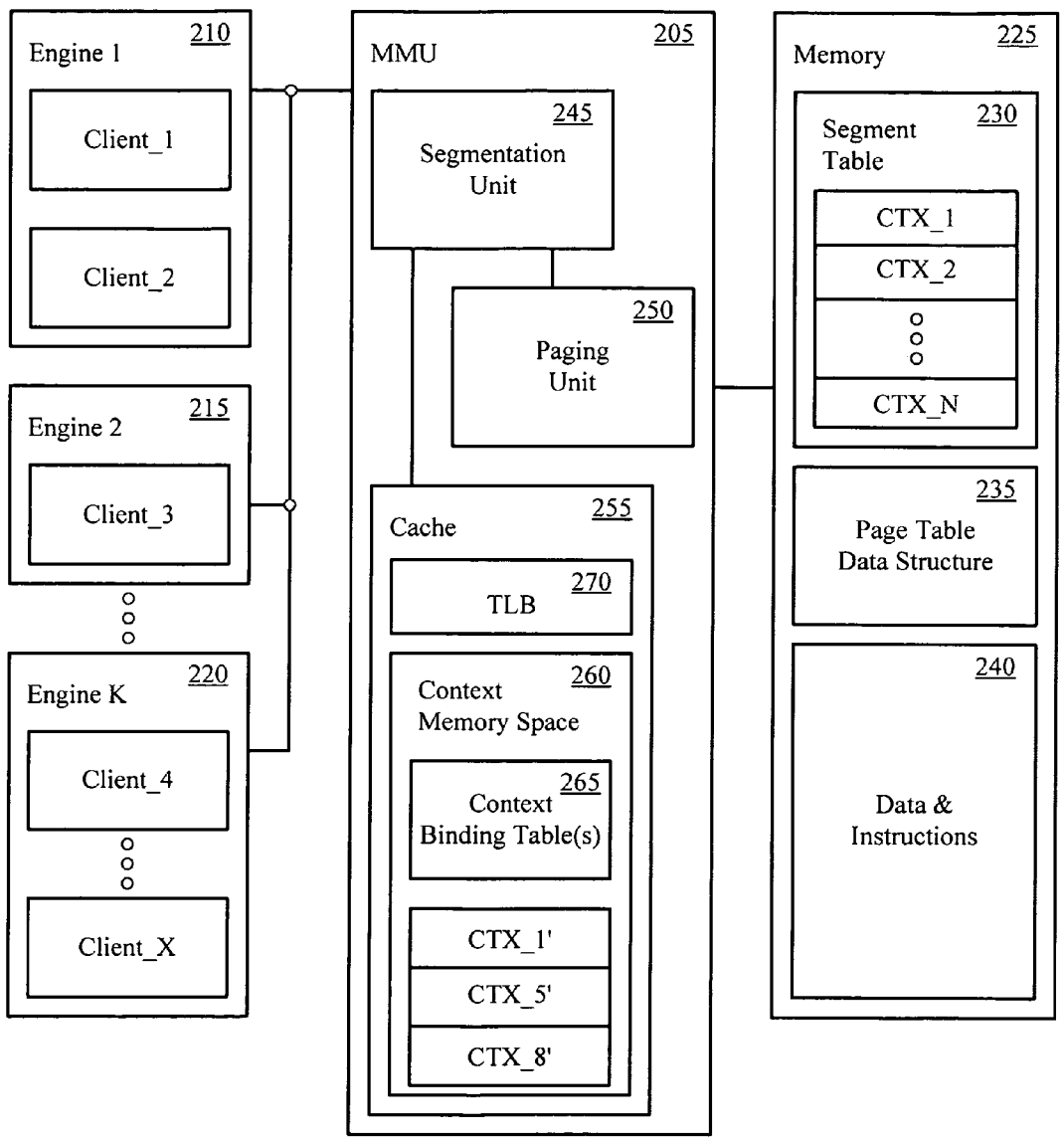
FIG. 2 shows a block diagram of a memory access system, in accordance with one embodiment of the present invention.

Referring now to FIG. 2, a memory access system 200, in accordance with one embodiment of the present invention, is shown. The memory access system 200 includes a memory management unit (MMU) 205 coupled between one or more engines 210, 215, 220 and a separate computing-device readable medium, such as random access memory (RAM) 225. Typically the path between the engines 210, 215, 220 and the MMU 205 includes a request path, a write path and a read path.

The computing device-readable medium 225 may store one or more segment tables 230, one or more page table data structures 235, and data and instructions 240. The segment table 230 includes a plurality of context specifiers CTX_1-CTX_N.

The MMU 205 includes a segmentation unit 245, a paging unit 250 and an on-chip computing device-readable medium, such as a cache 255. Each engine 210, 215, 220 may include one or more clients Client_1-Client_X. The segmentation unit 245, of the MMU 205, is adapted to cache one or more of the context specifiers, for example CTX_1', CTX_5' and CTX_8', in a context memory space 260. The cache location of each particular context specifier is bound to a corresponding context index and cached in a context binding table 265 in the context memory space 260. The location in RAM 225 of a given context specifier (e.g., CTX_5) and a context index is received by the MMU 205. The segmentation unit 245 retrieves the given context specifier at the location in RAM 225 and caches it in the context memory space 260. The context index is bound to the location of the given context specifier in the context memory space 260 and stored in the context binding table.

In one implementation, the binding of the context index identifies the complete location of the given context in the context memory space 260. In another implementation, a block bind is performed for each running context of each engine to specify a base address of a context region (e.g., a block pointer to a given one of a plurality of context binding tables). Thus, the MMU 205 tracks the context memory space for multiple contexts. An object bind is performed for the context index to specify the offset into the given context binding table. In particular, an entry in a context binding table 260, as shown in FIG. 3 and described below, is generated that maps the corresponding context index to the location of the given context specifier.

The segmentation unit 245 is also adapted to perform memory access transactions in combination with the paging unit 250. In particular, the segmentation unit 245 receives a memory access request from any client (e.g., Client_3) of any engine 215. The memory access request includes a given context index and a context offset. The context index is utilized by the segmentation unit 245 to access the context binding table 265 in the MMU 205 cache 255. The context binding table 265 provides a mapping of the given context index to a given context specifier (e.g., DMA_CTX_8') cached in the context memory space 260. The given context specifier may store a base address, a limit and one or more other attributes as illustrated in FIG. 3. The context offset of the memory access request may be checked against the limit field in the given context specifier. If the context offset exceeds the limit a limit violation is returned to the client, which may decide whether to proceed with the memory access request.

The segmentation unit 245 also generates a virtual address from the base address in the given context specifier and the context offset. The paging unit 250 translates the virtual address to a physical address using a translation lookaside buffer (TLB) 270 stored in the cache 255 of the MMU 205 or the page table data structure stored in the RAM 225.

Figure 3:
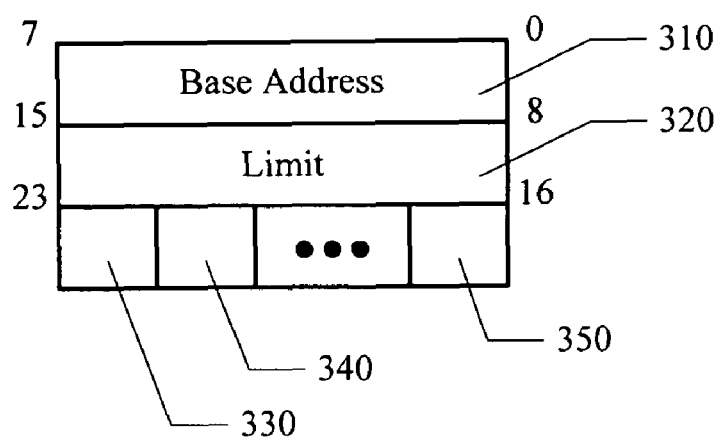
FIG. 3 shows a block diagram of context specifier, in accordance with one embodiment of the present invention.

Referring now to FIG. 3, a context specifier 300, in accordance with one embodiment of the present invention, is shown. The context specifier (e.g., direct memory access context) 300 may be approximately 16-32 bytes. The context specifier 300 includes a base address 310, a limit 320 and one or more other attributes 330, 340, 350. In one implementation, the base address 310 may be eight bytes, the limit 320 may be eight byes and the other attributes 330, 340, 350 may be stored in one or more fields that consume another eight bytes. Accordingly, it is appreciated that each context specifier 300 may be a few bytes, while a TLB can be thousands of bytes.

Figure 4:
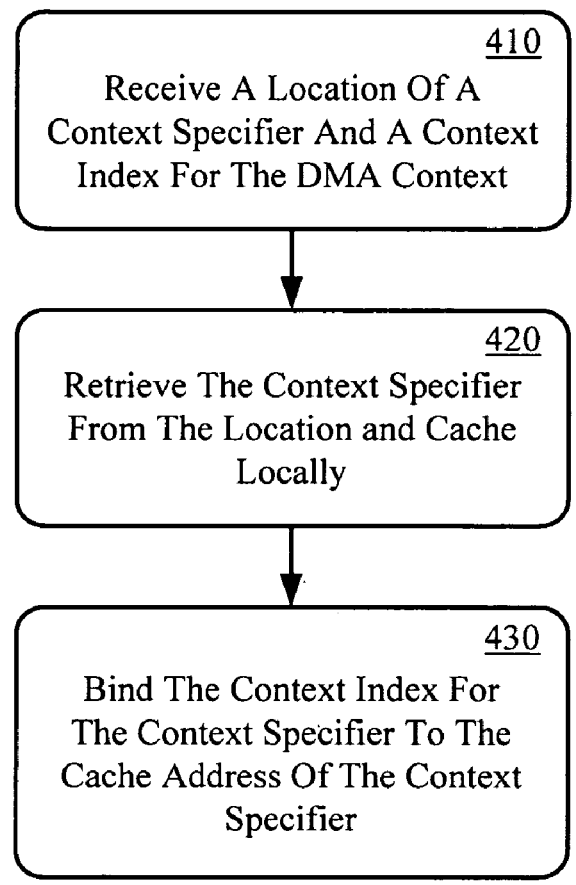
FIG. 4 shows a flow diagram of a method of caching segmentation data, in accordance with one embodiment of the present invention.

Referring now to FIG. 4, a method of caching segmentation data, in accordance with one embodiment of the present invention, is shown. The method includes receiving a location of a context specifier and a corresponding context index, at 410. In particular, an index and a location are received for each of one or more context specifiers. The location is an address of the context specifier stored in a computing device readable medium. The context index is to be used to specify the corresponding context specifier in memory access requests.

At 420, the context specifier is retrieved from the location and cached. In particular, for each location and context index value received, the context specifier at the given location is retrieved and cached locally. At 430, a binding of the context index and the context specifier is generated. In one implementation, a mapping between the context index and the cache address of the corresponding context specifier is cached in a context binding table. Thus, the context index identifies the full cache address of the corresponding context specifier. In another implementation, a block bind is performed to specify a block binding table for each context used by an engine. The resulting block pointer identifies the base address of a particular block bind table for each engine. An object bind is performed to map the context specifier to the offset into the block bind table. The resulting object pointer identifies the cache address of the given context specifier stored at the offset in the block bind table.

Figure 5:
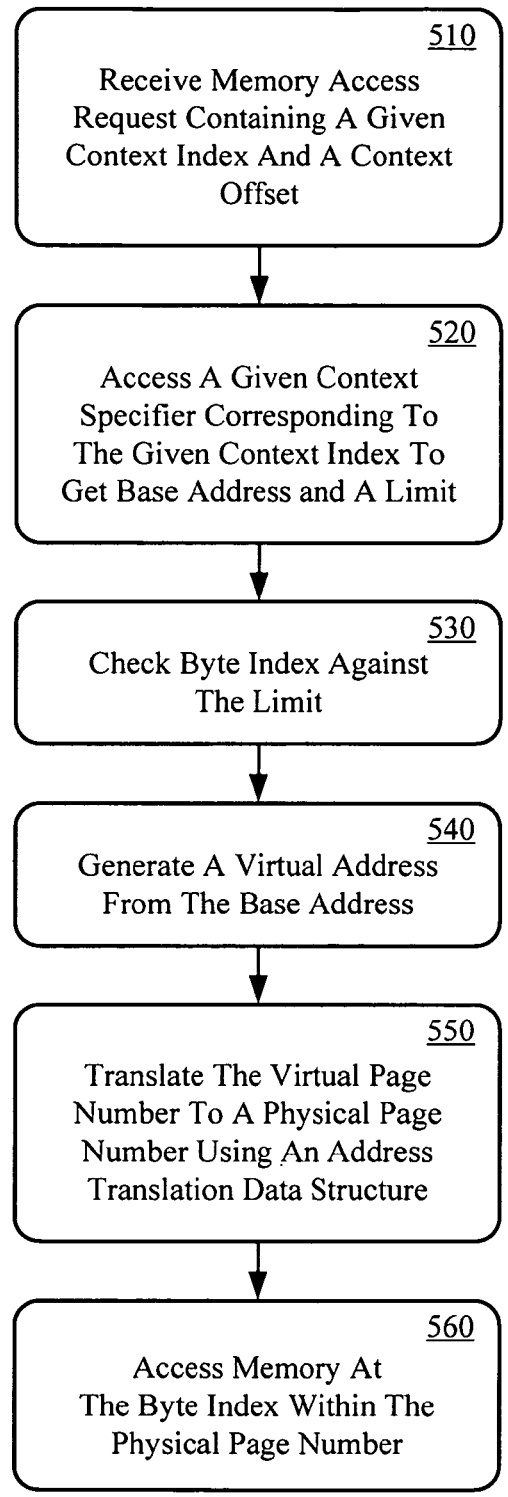
FIG. 5 shows a flow diagram of a method of utilizing cached segmentation data, in accordance with one embodiment of the present invention.

Referring now to FIG. 5, a method of utilizing cached segmentation data, in accordance with one embodiment of the present invention, is shown. The method includes receiving a memory access request containing a given context index and a context offset, at 510. The memory access request may be a read operation or a write operation. At 520, a given context specifier corresponding to the given context index is accessed. In one implementation, a given bind in a context binding table provides the full cache address of the given context specifier cached locally. In another implementation, a given one of a plurality of context binding tables is determined from a block bind maintained by the MMU for the engine submitting the memory access request. The context index is utilized to index the given one of the plurality of context binding tables. A given object bind in the given context binding table that matches the context index provides the cache address of the given context specifier cached locally.

At 530, the context offset from the memory access request is checked against the limit in the given context specifier. If the context offset is greater than the limit, a limit violation is returned back to the client.

At 540, a virtual address is generated utilizing the base address in the context specifier. In particular, a virtual address generated from the base address of the given context specifier buffered locally and the context offset contained in the memory access request. At 550, the virtual address is translated to a physical address using a translation lookaside buffer (TLB) or page table data structure. In a two level page table data structure implementation, the virtual page number is used to index an appropriate page table specified in a page directory to obtain a physical page number. At 560, the computing device-readable medium at the physical address is accessed. For example, data received from a client may be stored in the computing device-readable medium at the location within the physical page number specified by a byte index in response to a write request. In response to a read request, data stored at the byte index within the physical page number of the computing device-readable medium can be retrieved for the client.

Embodiments of the present invention centralize management of the context specifiers in the MMU. In particular, the MMU manages various types of faults and violations that may occur as a result of the attributes specified in the context specifier. As a result, the clients do not need to know the data format of the context specifiers, fault and limit violation semantics and/or the like. Accordingly, centralizing management of context specifiers in the MMU simplifies the design of the various clients.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of accessing memory comprising:
   receiving a context index and a location of a context specifier stored in memory storing a plurality of context specifiers, wherein the specifier is used to generate a virtual address;
   retrieving the context specifier from the location in the memory;
   caching the context specifier locally at a cache address in a context memory space separate from the memory; and
   binding the context index to the cache address.

2. The method according to claim 1, further comprising receiving a location of a context specifier and a context index for each of one or more contexts.

3. The method according to claim 1, wherein binding the context index to the cache address comprises:
   generating a mapping between the context index and the cache address; and
   storing the mapping in a context binding table.

4. The method according to claim 1, further comprising:
   receiving a memory access request including a given context index and a context offset;
   accessing a given context specifier corresponding to the given context index to get a base address; and
   generating a virtual address utilizing the base address.

5. The method according to claim 4, further comprising:
   translating the virtual address to a physical address using an address translation data structure; and
   accessing computing device-readable medium at the physical address.

6. The method according to claim 4, further comprising:
   wherein the given context specifier further includes a limit;
   checking the context offset against the limit; and
   generating a limit violation if the context offset is greater than the limit.

7. A method of accessing memory comprising:

receiving a memory access request including a given context index and a context offset;

accessing a given context specifier corresponding to the given context index, wherein the given context specifier includes a base address; and generating a virtual address from the base address and the context offset.

8. The method according to claim 7, wherein the memory access request comprises a read operation.

9. The method according to claim 7, wherein the memory access request comprises a write operation.

10. The method according to claim 7, wherein accessing the given context specifier corresponding to the given context index comprises determining a location of the given context specifier cached locally from a context binding table using the given context index.

11. The method according to claim 7, further comprising:
translating the virtual address to a physical address using an address translation data structure; and
accessing a computing device-readable medium at the physical address.

12. The method according to claim 7, further comprising:
wherein the given context specifier further includes a limit;
checking the context offset against the limit; and
generating a limit violation if the context offset is greater than the limit.

13. A memory access system comprising:
a first computing-device readable medium including a plurality of context specifiers, wherein each context specifier is used to generate a corresponding virtual address; and
a memory management unit, communicatively coupled to the first computing-device readable medium, comprising;
a second computing device-readable medium; and
a segmentation unit to cache one or more of the plurality of context specifiers in the second computing device-readable medium and to bind a cache location of each particular context specifier to a corresponding context index.

14. The memory access system of claim 13, wherein the binding of the cache location of each particular context specifier to a corresponding context index cached in the second computing device-readable medium is mapped in a context binding table stored in the second computing device-readable medium.

15. The memory access system of claim 14, wherein:
the first computing device-readable medium is separate from the memory management unit; and
the second computing device-readable medium is on a chip that includes the memory management unit.

16. The memory access system of claim 14, wherein memory management unit further comprises:
a paging unit; and
the segmentation unit further to perform a memory access in combination with the paging unit.

17. The memory access system of claim 14, wherein the segmentation unit utilizes the context binding table and a given one of the cached context specifiers to generate a virtual address for a given memory access request.

18. The memory access system of claim 17, wherein the paging unit utilizes an address translation data structure to translate the virtual address to a physical address.

19. The memory access system of claim 18, wherein the address translation data structure comprises:
a translation lookaside buffer cached in the second computing device-readable medium; and
a page table data structure stored in the first computing device-readable medium.

* * * * *